US012323226B2

(12) United States Patent
Ganesan et al.

(10) Patent No.: US 12,323,226 B2
(45) Date of Patent: Jun. 3, 2025

(54) HYBRID SATELLITE INTERNET ACCESS

(71) Applicant: Hughes Network Systems, LLC, Germantown, MD (US)

(72) Inventors: Venkat Ganesan, Germantown, MD (US); Michael Chin, San Diego, CA (US); Krishna Samavedam, Germantown, MD (US); Akshay Ravichandran, Gaithersburg, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 419 days.

(21) Appl. No.: 17/819,150

(22) Filed: Aug. 11, 2022

(65) Prior Publication Data

US 2023/0370162 A1    Nov. 16, 2023

Related U.S. Application Data

(60) Provisional application No. 63/340,488, filed on May 11, 2022.

(51) Int. Cl.
     *H04W 84/06*      (2009.01)
     *H04B 7/185*      (2006.01)
     *H04W 24/08*      (2009.01)

(52) U.S. Cl.
     CPC ....... *H04B 7/1858* (2013.01); *H04B 7/18586* (2013.01); *H04B 7/18597* (2013.01); *H04W 24/08* (2013.01); *H04W 84/06* (2013.01)

(58) Field of Classification Search
     CPC .......................... H04B 7/18586; H04W 24/08

USPC ......................................... 370/329, 401, 403
See application file for complete search history.

(56) References Cited

U.S. PATENT DOCUMENTS 8,824,508 B2 *   9/2014   Stroud ................... H04L 69/16
                                                                               370/474

OTHER PUBLICATIONS

International Search Report and Written Opinion for PCT/US2023/064082 mailed Jun. 2, 2023 (11 pages).

Niephaus, Christian: "Traffic Offloading in a Converged Satellite and Terrestrial Network", PhD Thesis, May 1, 2020 (May 1, 2020), pp. 1-197, XP093049163, London UK; Retrieved from the Internet: URL: https://bura.brunel.ac.uk.bitstream/2434/22074/1/FulltextThesis.pdf; [retrieved on May 24, 2023] chapters 1, 2, 6; figures 1.2-1.8, 6.1-6.5.

Open Networking Foundation: "OpenFlow Switch Specification", Mar. 26, 2015 (Mar. 26, 2015), pp. 1-283, XP093014448, Retrieved from the Internet: URL: https://opennetworking.org/wp-content/uploads/2014/10/openflow-switch-v1.5.1.pdf [retrieved on Jan. 16, 2023] section 5.10.2.

* cited by examiner

*Primary Examiner* — Dang T Ton
(74) *Attorney, Agent, or Firm* — Brooks Kushman P.C.

(57) ABSTRACT

A system comprising an accelerator including a first physical port couplable to a first module and a second physical port configured to communicate with a wide-area network. The accelerator is programmed to receive outbound data from user devices via the first module, and route the outbound data to either the first physical port or the second physical port. The first module is a separate unit from the accelerator. The first module includes an indoor unit configured for satellite internet.

20 Claims, 8 Drawing Sheets

HYBRID SATELLITE INTERNET ACCESS

CROSS-REFERENCE TO RELATED APPLICATIONS

This application claims priority to U.S. Provisional Application No. 63/340,488, filed on May 11, 2022, which application is hereby incorporated herein by reference in its entirety.

BACKGROUND

Satellite internet access is internet access provided through communication satellites. Satellite internet relies on three primary components: a satellite, a number of ground stations serving as gateways, and a number of ground stations for subscribers. The gateways relay internet data to and from the satellite via radio waves such as microwaves. Each subscriber ground station includes a radio antenna and a connection to the subscriber's devices.

DETAILED DESCRIPTION

With reference to the Figures, wherein like numerals indicate like parts throughout the several views, a system 102 includes an accelerator 104 including a first physical port 142 couplable to a first module 106 and a second physical port 144 configured to communicate with a wide-area network 108. The accelerator 104 is programmed to receive outbound data from user devices 110 via the first module 106, and route the outbound data to either the first physical port 142 or the second physical port 144. The first module 106 is a separate unit from the accelerator 104. The first module 106 includes an indoor unit 146 configured for satellite internet. The system 102 may further include the first module 106.

The system 102 provides the ability to integrate the accelerator 104 to an existing satellite internet service provided via the first module 106. The accelerator 104 can provide a low-latency internet connection to combine with a high-throughput internet connection via the first module 106. The accelerator 104 can be programmed to route packets to whichever of the wide-area network 108 or satellite connection provides the best connection for those packets. If one of the satellite connection or wide-area network 108 are unavailable, the accelerator 104 and/or the first module 106 can automatically route packets to the other of the satellite connection or wide-area network 108. The accelerator 104 can be programmed to automatically perform the necessary steps for installation once plugged into a local-area network 134 to which the first module 106 is connected. The system 102 thus provides low cost because existing components do not need to be replaced, and the system 102 further provides easy installation.

Figure 1:
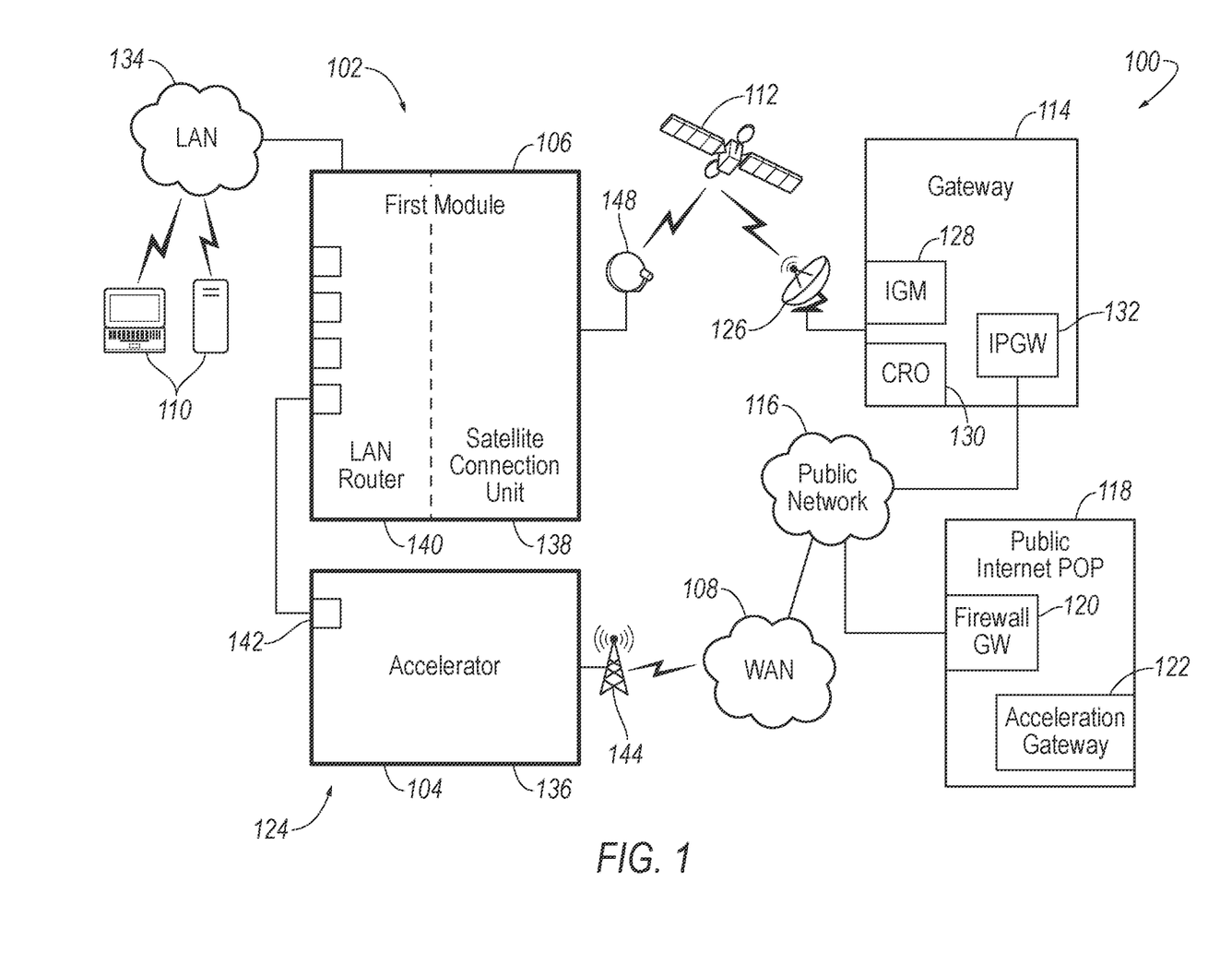
FIG. 1 is a diagram of an example satellite-communications system.

With reference to FIG. 1, a satellite-communications system 100 can include one or more satellites 112, one or more gateways 114, a public network 116 such as the internet, the wide-area network 108, customer-premises equipment 124, and the user devices 110. This satellite-communications system 100 provides a dual-path architecture for connecting the user devices 110 to the public network 116, either via a satellite 112 and a gateway 114 or via the wide-area network 108.

The satellites 112 collectively form a constellation (i.e., a group) of network nodes whose position may change relative to one another, to the ground, or to both. The satellites 112 include various circuits, chips, or other electronic components. For example, the satellites 112 may be in low Earth orbit (LEO) in multiple planes and orbits relative to one another or in a geostationary orbit (GEO). The satellites 112 may be high-throughput satellites that communicate using spot beams.

The satellite-communications system 100 can include multiple gateways 114. Each gateway 114 may be a site for converting the microwave transmissions from the satellites 112 to digital signals that can be sent over the public network 116. Each gateway 114 can include an antenna structure 126 for receiving and sending transmissions to the satellites 112. A signal from the satellite 112 to the gateway 114 passes through an inroute group manager (IGM) 128, which manages signal traffic; then a code rate organizer (CRO) 130, which performs queuing and scheduling of IP packets from the signal; and then an internet protocol gateway (IPGW) 132, which forwards packets over the public network 116 and receives the packets from the public network 116.

The public network 116 can include, e.g., the internet, as well as facilities owned by an internet-service provide (ISP) for connecting to the internet. The gateway 114 and data passing through the wide-area network 108 from the customer-premises equipment 124 can connect to the public network 116 at a point-of-presence (POP) 118. In other words, data from the customer-premises equipment 124 arrives to the public network 116 via the POP 118 regardless of whether the data traveled via the wide-area network 108 or the satellite 112. The POP 118 can include a firewall gateway 120 to prevent malicious transmissions. The POP 118 can include an acceleration gateway 122. The acceleration gateway 122 has a tunnel connection with an acceleration algorithm 304 of the accelerator 104 of the customer-premises equipment 124, as will be described below.

The wide-area network (WAN) 108 is any network to which the customer-premises equipment 124 may be connected and which extends outside of a user's facility on which the customer-premises equipment 124 is installed. The wide-area network 108 has a lower latency but possibly also a lower throughput than a communication path through the satellite 112. For example, the wide-area network 108 can be a wireless network for mobile devices and other terminals complying with one or more standards promulgated by the 3rd Generation Partnership Project (3GPP), e.g., 4G, Long-Term Evolution (LTE), 5G, etc. For another example, the wide-area network 108 may be a wired network or some alternative type of network such as DSL, cable, fiber, microwave, an LEO satellite network, etc. The wide-area network 108 connects to the public network 116.

The customer-premises equipment 124 connects the user devices 110 to the satellite 112 and to the wide-area network 108. The customer-premises equipment 124 can include hardware installed at a user's facility and connected to the local-area network 134. The customer-premises equipment 124 routes data and requests from the user devices 110 to either the satellite 112 or the wide-area network 108, as will be described in more detail below. The customer-premises equipment 124 includes the first module 106 and a second module 136. The first module 106 includes a satellite-connection unit 138 and a LAN router 140, which will be described below. The second module 136 is or includes the accelerator 104, which will also be described below. The first module 106 can be an integrated module, i.e., packaged together as a single unit within a single housing. The second module 136 can also be an integrated module. The second module 136 is physically separate and distinct from the first module 106. This packaging permits the second module 136 to be used as an upgrade by a customer that, e.g., already possess the first module 106, or the modules 106, 136 can be provided together.

The user devices 110 are computing devices such as desktop computers, laptop computers, mobile phones such as smartphones, tablets, internet-of-things (IoT) devices, etc. The user devices 110 are computing devices generally including a processor and a memory. The user devices 110 are communicatively connected to the customer-premises equipment 124 via the local-area network 134, which may include a Wi-Fi network and/or wired connections.

With reference to FIGS. 3-4 and 6-8, the customer-premises equipment 124 includes the first module 106 and the second module 136. The first module 106, the second module 136, and the user devices 110 can be communicatively coupled together with wired and/or wireless connections, e.g., over the local-area network 134. The first module 106 can include the LAN router 140 and the satellite-connection unit 138. The second module 136 can include or be the accelerator 104.

The first module 106 can be a microprocessor-based computing device, e.g., a generic computing device including a processor and a memory. The memory of the first module 106 can include media for storing instructions executable by the processor as well as for electronically storing data and/or databases. The first module 106 can include separate processors and memories for the LAN router 140 and the satellite-connection unit 138, or the LAN router 140 and the satellite-connection unit 138 can share a processor and a memory that are virtually divided between the LAN router 140 and the satellite-connection unit 138.

The LAN router 140 provides connections for the user devices 110 to connect to the local-area network 134 as well as to the public network 116. The LAN router 140 can route packets to and from the user devices 110, as is known. The LAN router 140 can an algorithm 410 providing network address and port translation (NAPT), i.e., changing IP addresses and port numbers in the headers of the IP packets passing through the LAN router 140 to translate between the schemes on the public network 116 and on the local-area network 134. "Port" refers to a communication endpoint, which can be a logical construct that identifies a specific process or type of network service.

The satellite-connection unit 138 receives signals from the satellite 112 and sends signals to the satellite 112. The satellite-connection unit 138 can include an outdoor unit (ODU) 148 and the indoor unit (IDU) 146. (The outdoor unit 148 is shown in FIG. 1.) The outdoor unit 148 can include an antenna, a feed, a block upconverter (BUC), and a low-noise block downconverter (LNB). The antenna can a reflective dish-type radio antenna, in particular a very-small-aperture terminal (VSAT), defined as having a diameter no more than 3.8 meters, generally 0.75 to 1.2 m. The feed receives signals from the satellite 112 reflected off of the antenna dish's surface and transmits outbound signals to the satellite 112. The block upconverter converts the signal from a modem of the indoor unit 146 to a higher frequency and amplifies the signal for transmission to the satellite 112. The low-noise block downconverter amplifies and filters the signal received from the satellite 112. The indoor unit 146 can include the modem. The portion of the satellite-connection unit 138 housed in the first module 106 can be the indoor unit 146.

Figure 3:
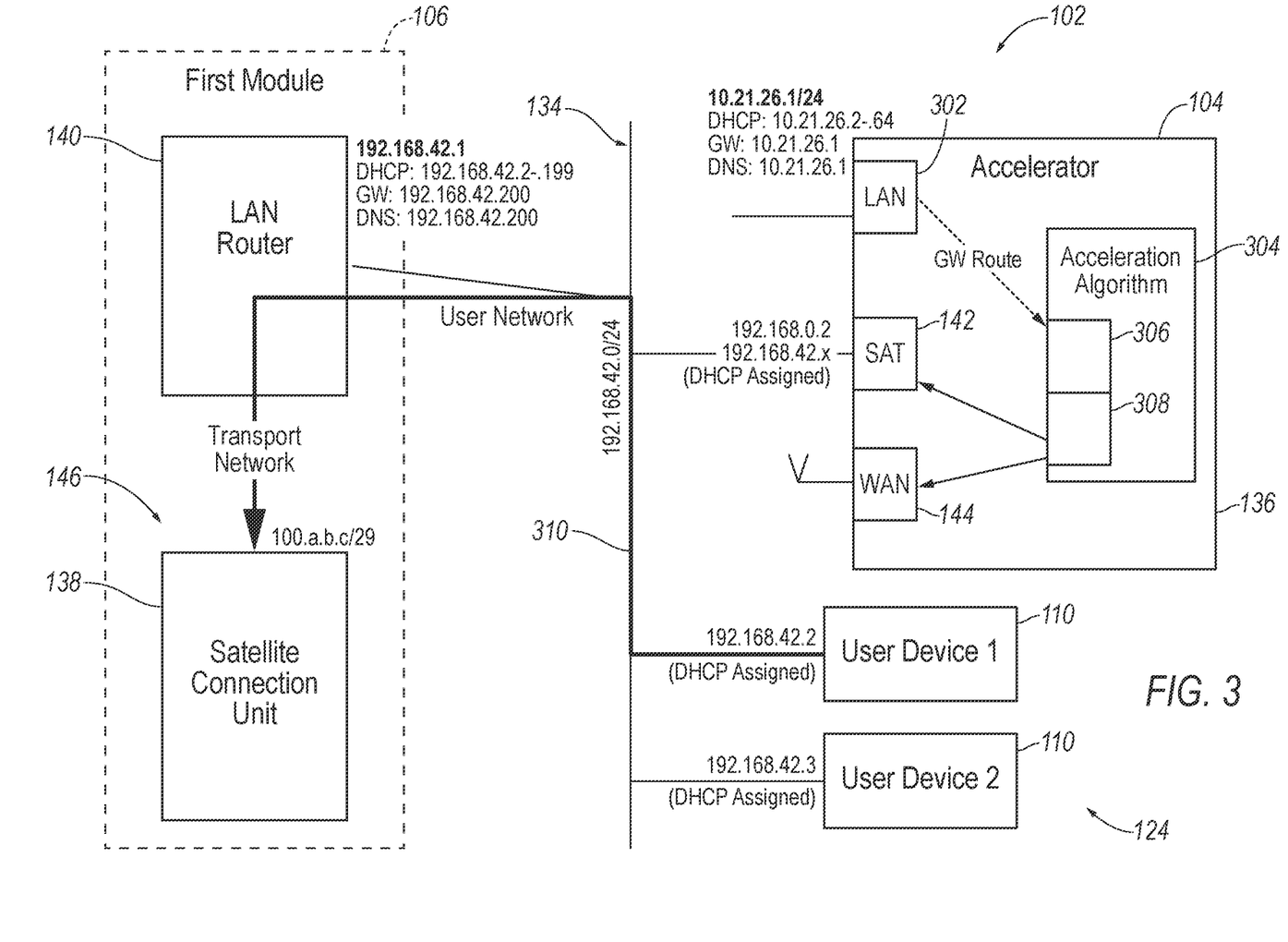
FIG. 3 is a block diagram of the customer-premises equipment.
Figure 4:
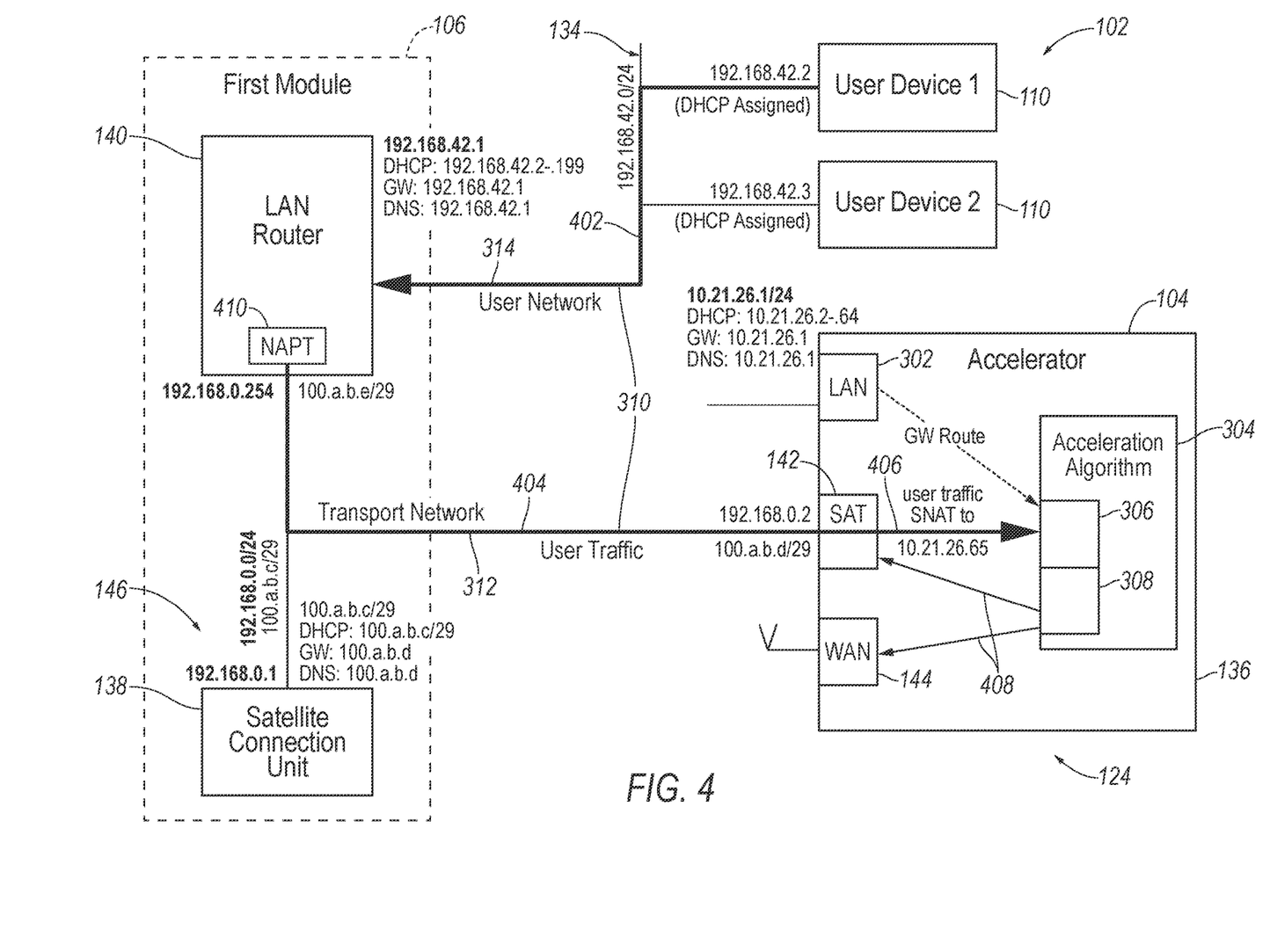
FIG. 4 is a block diagram of the customer-premises equipment with an accelerator installed and with a wide-area network and a satellite both available for communication.

The accelerator 104 routes outbound traffic 310 from the user devices 110 to the wide-area network 108 or to the satellite 112 via the satellite-connection unit 138. The accelerator 104 can include three physical ports, a LAN port 302, the first physical port 142, and the second physical port 144. The LAN port 302 is connected to the local-area network 134. The first physical port 142 is connected to the first module 106. The second physical port 144 is connected, e.g., wirelessly, to the wide-area network 108. The accelerator 104 can be a microprocessor-based computing device, e.g., a generic computing device including a processor and a memory. The memory of the accelerator 104 can include media for storing instructions executable by the processor as well as for electronically storing data and/or databases.

The accelerator 104 can be programmed with an acceleration algorithm 304. The acceleration algorithm 304 can include a first software module 306 for receiving packets from the first physical port 142 or the LAN port 302 and a second software module 308 for routing the packets to either the first physical port 142 or the second physical port 144. The acceleration algorithm 304 can determine whether an outbound packet from one of the user devices 110 should be sent to the satellite 112 or to the wide-area network 108. The acceleration algorithm 304 can determine between the satellite 112 and the wide-area network 108 based on, e.g., the latency sensitivity and/or throughput demands of the packet. Packets for which low latency is comparatively more important than high throughput can be routed to the wide-area network 108. Packets for which high throughput is comparatively more important than low latency can be routed to the satellite 112 via the satellite-connection unit 138. (For inbound packets on the public network 116, the acceleration gateway 122 at the POP 118 can make a similar determination for routing the packets through the satellite 112 or the wide-area network 108 back to the customer-premises equipment 124 and the user devices 110.) The accelerator 104, specifically the second software module 308, routes packets to the satellite 112 by sending them out through the first physical port 142, and the accelerator 104, specifically the second software module 308, routes packets to the wide-area network 108 by sending them out through the second physical port 144.

Figure 2:
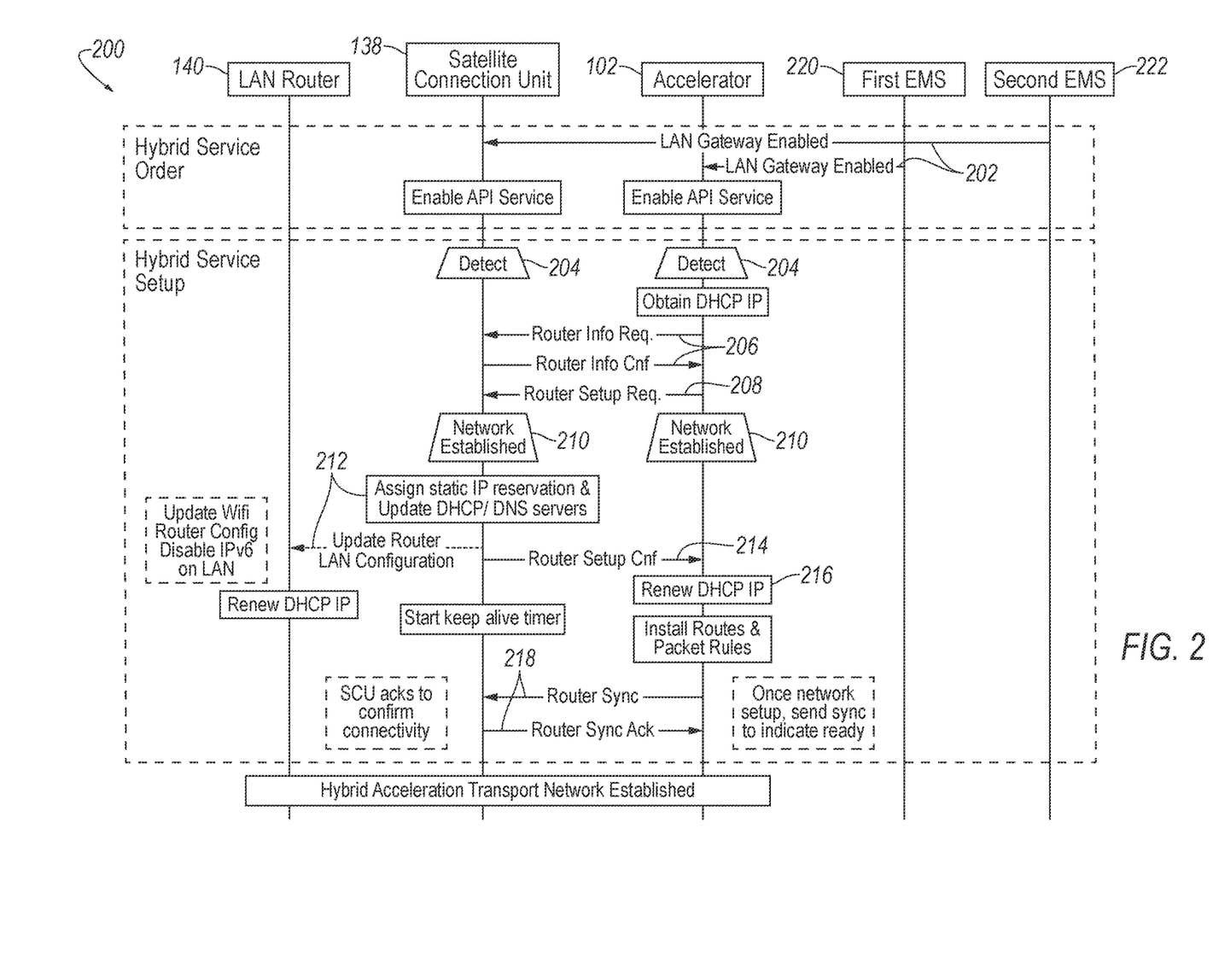
FIG. 2 is a sequence diagram showing an example method for installing an accelerator into customer-premises equipment of the satellite-communications system.

FIG. 2 is a sequence diagram showing an example method 200 for installing the accelerator 104. The sequence diagram shows communications between the LAN router 140, the satellite-connection unit 138, the accelerator 104, a first element management system 220, and a second element management system 222. The element management systems 220, 222 include systems and applications for managing network elements of the respective networks, i.e., elements operating through the wide-area network 108 for the first element management system 220 and elements operating through the satellite 112 for the second element management system 222. The elements managed by the first element management system 220 can include the accelerators 104 installed at different locations. The elements managed by the second element management system 222 can include the satellite-connection units 138 installed at different locations. The element management systems 220, 222 are located remotely from the customer-premises equipment 124.

At Step 202, the second element management system 222 configures the satellite-connection unit 138 for connecting with the accelerator 104, and the first element management system 220 configures the accelerator 104 for installation with the satellite-connection unit 138. At this point, the accelerator 104 may or may not yet be physically connected to the satellite-connection unit 138. The second element management system 222 can store a configuration or site for the satellite-connection unit 138, and the configuration or site for the satellite-connection unit 138 can be updated to include use of the satellite-connection unit 138 with the accelerator 104. In particular, the configuration or site can store a status for the satellite-connection unit 138 as operating in a hybrid mode, i.e., with the accelerator 104, and the configuration or site can store an identification of the specific accelerator 104 that is or will be installed. The first element management system 220 can store a configuration or site for the accelerator 104, and the configuration or site for the accelerator 104 can be updated to include use of the accelerator 104 with the satellite-connection unit 138. In particular, the configuration or site can store a status for the accelerator 104 as operating in a hybrid mode, i.e., with the satellite-connection unit 138, and the configuration or site can store an identification of the specific satellite-connection unit 138 that is or will be installed. The satellite-connection unit 138 and the accelerator 104 can be installed together at the same time, or the accelerator 104 can be installed with a satellite-connection unit 138 that is already in use. Upon receiving the configuration from the second element management system 222, the satellite-connection unit 138 waits for the initiation of the service from the accelerator 104.

At Step 204, the accelerator 104 is physically connected with the rest of the customer-premises equipment 124. This connection process does not require modifications to the satellite-connection unit 138 or its outdoor unit 148, which is beneficial because a field technician is not required to be on-site to support the installation. The accelerator 104 is connected to the satellite-connection unit 138, e.g., with a wired connection from the first physical port 142 to the first module 106 such as an ethernet cable. A cellular antenna and SIM card may be installed in the accelerator 104 for communication with the wide-area network 108. The accelerator 104 is plugged into a power supply. The accelerator 104 can be programmed to, once powered on for the first time, communicate with the first element management system 220 via the wide-area network 108 to acquire any required configuration parameters and to download any software updates. The accelerator 104 can be programmed to enter a "detect" state upon receiving a communication from the first element management system 220 indicating the status as hybrid mode, i.e., that service with the satellite-connection unit 138 is enabled (based on the configuration performed in Step 202). The satellite-connection unit 138 can be programmed to enter a "detect" state upon receiving a communication from the second element management system 222 indicating that service with the accelerator 104 is enabled (based on the configuration performed in Step 202).

The satellite-connection unit 138 and/or the accelerator 104 are programmed to perform Steps 206 through 218 below. Steps 206 through 218 can thus occur automatically, without intervention needed from a human operator.

At Step 206, the accelerator 104 can be programmed to, upon completing the installation described with respect to Step 204, transmit a message to the satellite-connection unit 138, e.g., initiate a router info request to detect the satellite-connection unit 138 and to confirm that the satellite-connection unit 138 has a status of hybrid mode, i.e., is enabled to provide service with the accelerator 104. If the accelerator 104 receives no response from the satellite-connection unit 138 within a short time threshold, e.g., 500 ms, then the accelerator 104 will retry at the end of a subsequent timeout period, e.g., 20 s.

At Step 208, the accelerator 104 can be programmed to, upon receiving the confirmation from the satellite-connection unit 138, initiate a router setup request sharing the media access control (MAC) address of the interface of the accelerator 104. The accelerator 104 can start a setup timer, e.g., for 60 s. If the satellite-connection unit 138 does not confirm setup status before the setup timer expires, the accelerator 104 will revert to the "detect" state described in Step 204.

At Step 210, the satellite-connection unit 138 and/or the accelerator 104 are programmed to begin updating the network configuration of the local-area network 134. In particular, a transport network 312 can be established that is distinct from the preexisting user network 314, as shown in FIG. 4; i.e., the local-area network 134 is divided into the transport network 312 and the user network 314. The transport network 312 and the user network 314 can be established as virtual LANs (VLANs). The user devices 110 and the LAN router 140 are connected to the user network 314, and the LAN router 140, the satellite-connection unit 138, and the accelerator 104 are connected to the transport network 312. The user network 314 and the transport network 312 can be disconnected except through the LAN router 140. The distinctness of the user network 314 and the transport network 312 can provide a single connection point to the user devices 110 despite the dual paths, i.e., satellite 112 or wide-area network 108, through which outbound and inbound traffic can travel. The satellite-connection unit 138 and the accelerator 104 can switch from the "detect" state to a "network established" state.

At Step 212, the satellite-connection unit 138 can be programmed to update the transport network 312 to be configured as an established network. The satellite-connection unit 138 can allocate a static IP reservation to the accelerator 104 and update DHCP/DNS servers with the static IP reservation. The satellite-connection unit 138 can update or configure the LAN router 140 with a new IP address. The satellite-connection unit 138 can update a bridging configuration of the LAN router 140 by auto-detecting the connected port of the accelerator 104, e.g., the LAN port 302, based on its MAC address (shared by a router setup request), can set up a bridge with the port of the satellite-connection unit 138, and can disable IPv6 on the LAN. The satellite-connection unit 138 can force a renewal of the DHCP IP on the LAN router 140.

At Step 214, the satellite-connection unit 138 can be programmed to, after updating the networking configurations in Step 212, indicate the update status, LAN configurations, and a keepalive configuration to the accelerator 104 via a router setup confirmation. The satellite-connection unit 138 can start a keepalive timer.

At Step 216, the accelerator 104 can be programmed to renew its DHCP assignment and install the necessary routes and packet rules. This step completes the setup of the accelerator 104.

At Step 218, the accelerator 104 can be programmed to, upon successfully completing its setup and configuration update, invoke a router sync to indicate that networking is now successfully established. The satellite-connection unit 138 receives the sync, and upon receiving the sync, sends an acknowledgement back to the accelerator 104. At this point the transport network 312 is fully established. The satellite-connection unit 138 begins sending keepalive messages to the accelerator 104.

FIG. 3 is a block diagram of the customer-premises equipment 124 before the transport network 312 is established, i.e., before the accelerator 104 is installed and operational. FIG. 3 shows outbound traffic 310, i.e., data, originating from one of the user devices 110. The outbound traffic 310 is sent to the LAN router 140, e.g., wirelessly via Wi-Fi or through a wired connection of the local-area network 134. The LAN router 140 passes the traffic 310 to the satellite-connection unit 138, and the satellite-connection unit 138 transmits the traffic 310 to the satellite 112 and finally to the public network 116 as shown in FIG. 1.

FIG. 4 is a block diagram of the customer-premises equipment 124 after the accelerator 104 is installed (i.e., after Step 218 of FIG. 2) in the situation in which the wide-area network 108 and the satellite 112 are both available. FIG. 4 shows outbound traffic 310 originating from one of the user devices 110. The traffic 310 traverses the user network 314 to the LAN router 140, either wirelessly via Wi-Fi or through the LAN, at Step 402. The traffic 310 is network address translated by the LAN router 140 to the transport network 312 and is forwarded to the accelerator 104 in Step 404. For example, the LAN router 140 can re-address traffic between the user network 314 and the transport network 312, e.g., perform a network address port translation (NAPT) with the algorithm 410 to change the source address to the address of the LAN router 140 on the transport network 312 and to change the destination address to the address of the accelerator 104 on the transport network 312. In Step 406, the accelerator 104 can perform network address translation to change the source to the traffic network address of the accelerator 104, moving the traffic 310 from the first physical port 142 to the first software module 306, and the accelerator 104 can use the acceleration algorithm 304 to determine whether to route the traffic 310 to the satellite 112 or the wide-area network 108, in the manner described above. In Step 408, the acceleration algorithm 304 routes the traffic 310 from the second software module 308 either to the first physical port 142 (addressed to the satellite-connection unit 138) to travel to the satellite 112 and then the public network 116, or to the second physical port 144 to traverse the wide-area network 108 to the public network 116.

Figure 5:
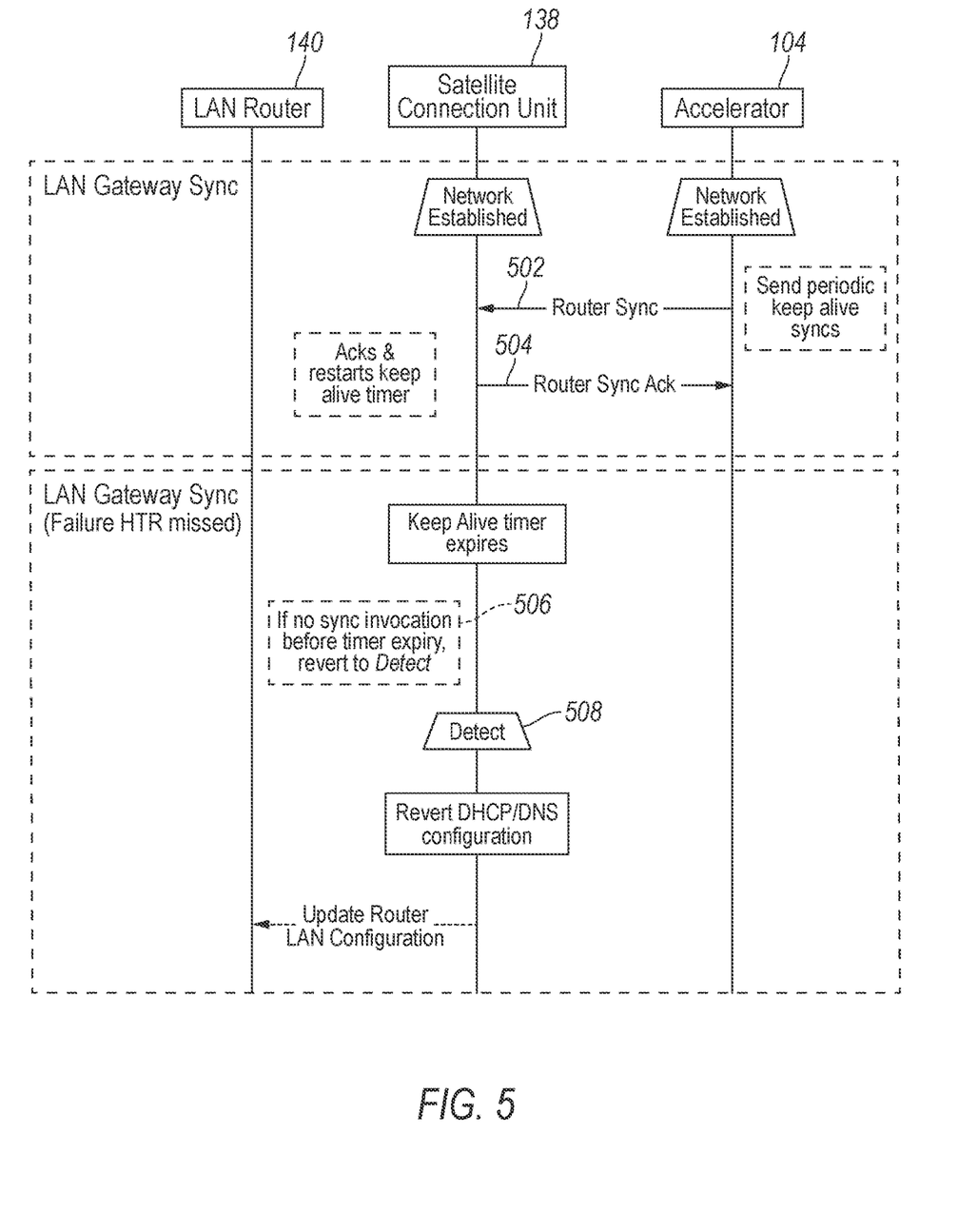
FIG. 5 is a sequence diagram for detecting a failure of the accelerator.

FIG. 5 is a sequence diagram for detecting a failure of the accelerator 104. Once the transport network 312 and user network 314 have been established as described above with respect to FIG. 2, the satellite-connection unit 138 and the accelerator 104 are each by default in the "network established" state. The accelerator 104 is programmed to, while in the "network established" state, periodically send keepalive messages or syncs to the satellite-connection unit 138 in Step 502. The satellite-connection unit 138 continuously counts down a timer, and the satellite-connection unit 138 resets the timer in response to receiving the keepalive message from the accelerator 104. The satellite-connection unit 138 also sends an acknowledgement back to the accelerator 104 together with resetting the timer in Step 504. If the timer expires, i.e., if the accelerator 104 fails to send the keepalive message, the satellite-connection unit 138 enters the "detect" state, in Step 506. This may occur if the accelerator 104 loses power or is removed from the LAN. The satellite-connection unit 138 reverts the LAN network configuration and the addressing back to their state from before the installation of the accelerator 104, i.e., the state immediately after Step 204 of FIG. 2, in Step 508.

Figure 6:
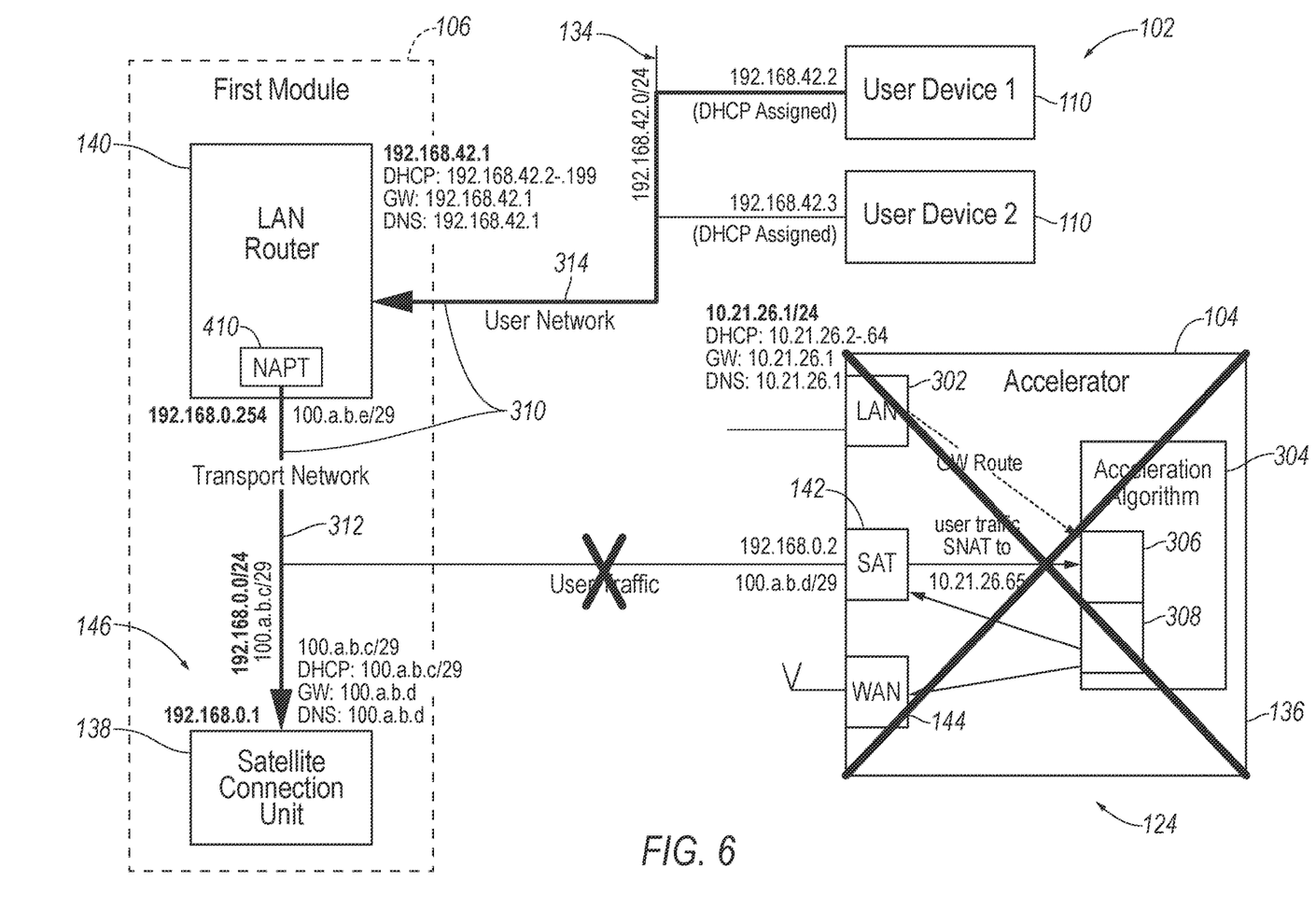
FIG. 6 is a block diagram of the customer-premises equipment in response to a failure of the accelerator.

FIG. 6 is a block diagram of the customer-premises equipment 124 experiencing a failure of the accelerator 104, detected as described with respect to FIG. 5. FIG. 6 shows outbound traffic 310 originating from one of the user devices 110. The traffic 310 traverses the user network 314 to the LAN router 140, either wirelessly via Wi-Fi or through a wired connection of the local-area network 134, at Step 602. The traffic 310 is network address translated by the LAN router 140 to the transport network 312 and is forwarded to the satellite-connection unit 138 in Step 604. For example, the LAN router 140 can perform a network address port translation (NAPT) to change the source address to the address of the LAN router 140 on the transport network 312 and to change the destination address to the address of the satellite-connection unit 138 on the transport network 312. The satellite-connection unit 138 transmits the traffic 310 to the satellite 112 to travel to the public network 116.

The accelerator 104 can be programmed to determine a health of a path to the public network 116 via the satellite-connection unit 138 and the satellite 112. Failure or poor health of the path to the public network 116 via the satellite 112 can occur due to, e.g., inclement weather. For example, the accelerator 104 can periodically send probe packets to the acceleration gateway 122 via the tunnel connection, e.g., over the wide-area network 108. The acceleration gateway 122 can use the probe packets to analyze the packets sent to the public network 116 over the satellite 112. For example, the probe packets can establish a baseline or expectation, against which the acceleration gateway 122 can compare the actual packets to detect packet loss, to determine latency, etc. The acceleration gateway 122 can send a message back to the accelerator 104 containing metrics such as packet loss, latency, etc. The accelerator 104 can detect a failure of the path to the public network 116 via the satellite 112 based on the metric of packet loss, e.g., upon detecting packet loss or upon detecting a rate of packet loss above a threshold. Even if the accelerator 104 has not detected a failure of the path to the public network 116 via the satellite 112, the acceleration algorithm 304 can use the health of the path, e.g., one or more metrics such as packet loss, latency, etc., to determine whether to route traffic 310 to the satellite 112 or to the wide-area network 108.

Figure 7:
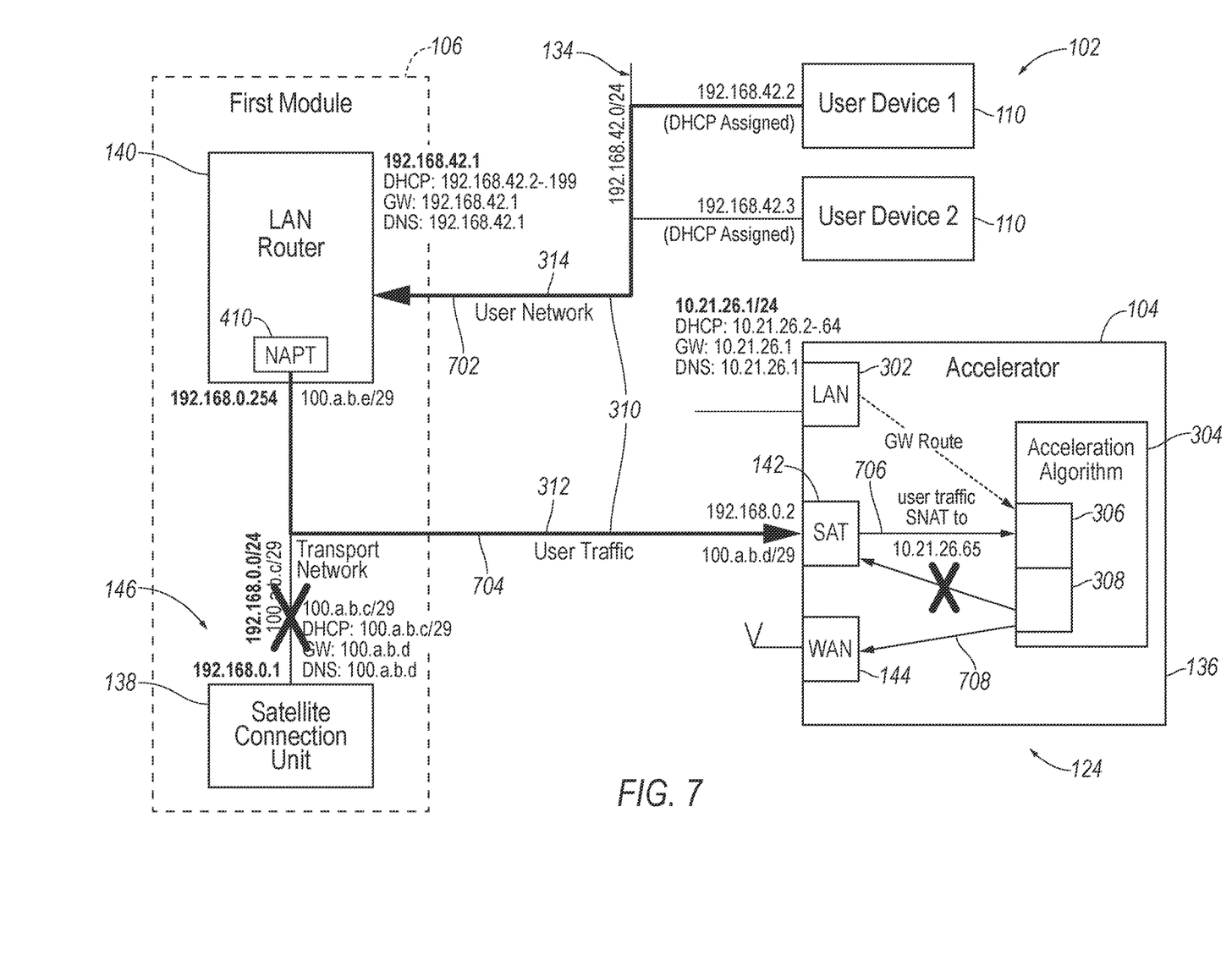
FIG. 7 is a block diagram of the customer-premises equipment in response to a failure of a communication path via the satellite.

FIG. 7 is a block diagram of the customer-premises equipment 124 experiencing a failure of the path to the public network 116 via the satellite 112. Steps 702, 704, and 706 occur in the same manner as described above with respect to Steps 402, 404, and 406, respectively, of FIG. 4. In Step 708, in response to determining the failure of the path to the public network 116 via the satellite, the acceleration algorithm 304 routes the traffic 310 from the second software module 308 to the second physical port 144 to traverse the wide-area network 108 to the public network 116.

The accelerator 104 can be programmed to perform policy-based routing of traffic 310. Policy-based routing is forwarding packets based on criteria other than the destination address of the packet. The criteria can be implemented by a network administrator. The policy-based routing can be separate from the acceleration algorithm 304. For example, packets containing voice data can be routed directly to the satellite-connection unit 138 without using the acceleration algorithm 304. Voice data packets can be, e.g., voice over internet protocol (VoIP) and/or output from an analog telephone adapter (ATA).

Figure 8:
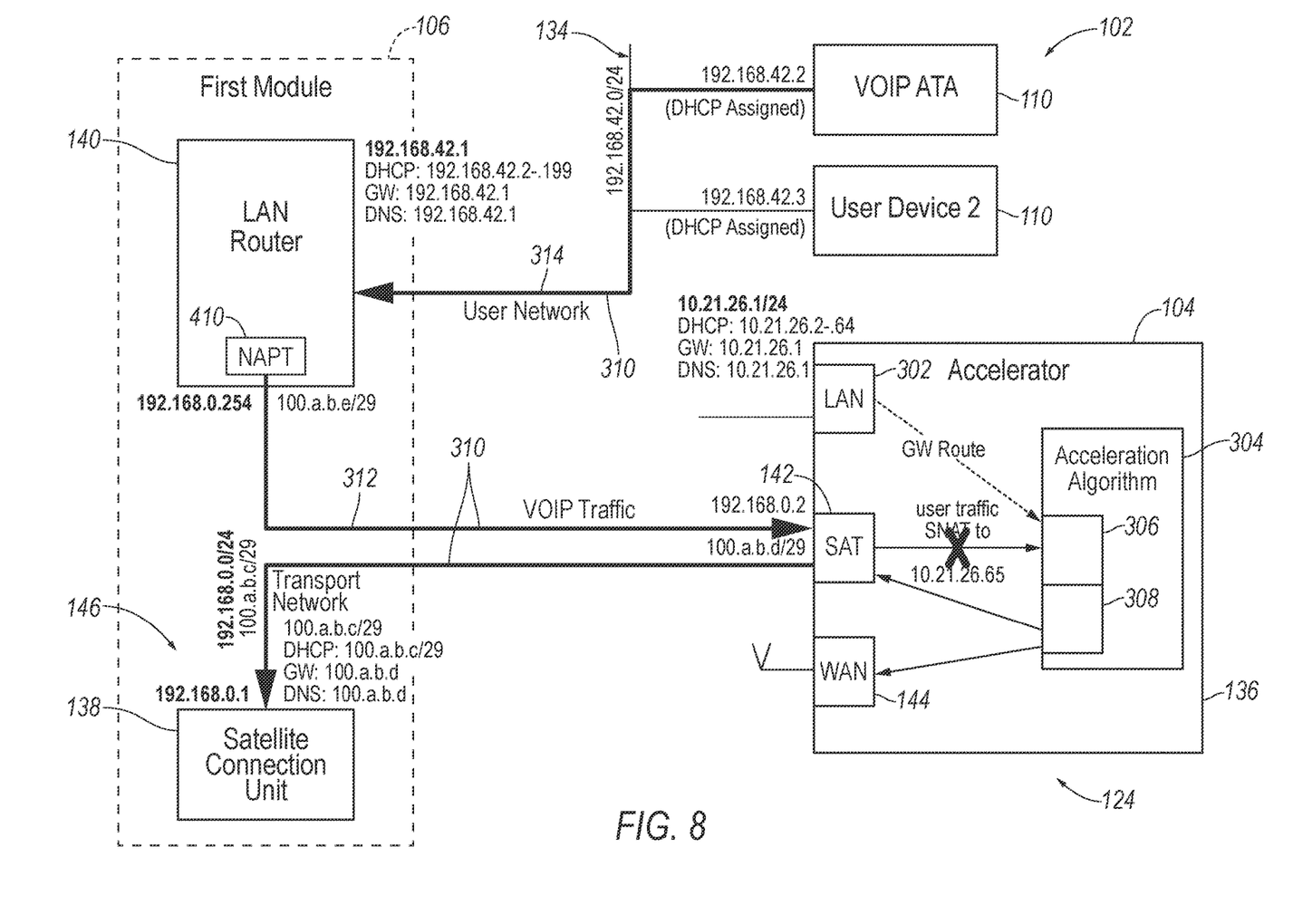
FIG. 8 is a block diagram of the customer-premises equipment routing voice data.

FIG. 8 is a block diagram of the customer-premises equipment 124 routing voice data. FIG. 8 shows outbound traffic 310 originating from one of the user devices 110. The traffic 310 traverses the user network 314 to the LAN router 140, either wirelessly via Wi-Fi or through a wired connection of the local-area network 134. The traffic 310 is network address translated by the LAN router 140 to the transport network 312 and is forwarded to the accelerator 104, specifically to the first physical port 142. The accelerator 104 then routes the traffic 310 to the satellite-connection unit 138 according to the policy-based routing without executing the acceleration algorithm 304. The satellite-connection unit 138 transmits the traffic 310 to the satellite 112 to travel to the public network 116.

The disclosure has been described in an illustrative manner, and it is to be understood that the terminology which has been used is intended to be in the nature of words of description rather than of limitation. The adjectives "first" and "second" are used throughout this document as identifiers and are not intended to signify importance, order, or quantity. Use of "in response to" and "upon determining" indicates a causal relationship, not merely a temporal relationship. Many modifications and variations of the present disclosure are possible in light of the above teachings, and the disclosure may be practiced otherwise than as specifically described.

What is claimed is:

1. A system comprising:
a second module including an accelerator, the accelerator including a first physical port couplable to a first module and a second physical port configured to communicate with a wide-area network, the first module being packaged together as a single unit within a single first housing, the second module being packaged together as a single unit within a single second housing, the second module being physically separate and distinct from the first module;
wherein the accelerator is programmed to;
receive outbound data from user devices via the first physical port from the first module;
upon determining to route the outbound traffic to satellite internet, route the outbound data to the first module via the first physical port; and
upon determining to route the outbound traffic to the wide-area network, route the outbound data to the wide-area network via the second physical port;
wherein the first module includes an indoor unit configured for the satellite internet.

2. The system of claim 1, further comprising the first module coupled to the first physical port of the accelerator.

3. The system of claim 2, wherein the indoor unit is programmed to periodically transmit a keepalive message to the accelerator.

4. The system of claim 2, wherein the first module includes a router.

5. The system of claim 4, wherein the first housing contains the indoor unit and the router.

6. The system of claim 4, wherein the accelerator is programmed to establish a user network to which the router and the user devices are connected and a transport network to which the accelerator and the indoor unit are connected.

7. The system of claim 6, wherein the router is connected to the transport network.

8. The system of claim 7, wherein the router is the only connection between the user network and the transport network.

9. The system of claim 7, wherein the router is programmed to re-address traffic between the user network and the transport network.

10. The system of claim 2, wherein a wired connection extends from the first module to the accelerator.

11. The system of claim 1, wherein the accelerator is programmed to, in response to being turned on for a first time, acquire configuration data from an element management system.

12. The system of claim 11, wherein the accelerator is programmed to acquire the configuration data from the element management system via the wide-area network.

13. The system of claim 11, wherein the accelerator is programmed to, in response to the configuration data indicating that the accelerator is providing service with the indoor unit, transmit a message to the indoor unit.

14. The system of claim 1, wherein the accelerator is programmed to transmit a keepalive message to the indoor unit.

15. The system of claim 14, wherein the indoor unit is programmed to, in response to failing to receive the keepalive message from the accelerator within a time threshold from receiving a previous keepalive message, revert a network configuration to a previous configuration.

16. The system of claim 1, wherein the accelerator is programmed to receive data indicating a health of the satellite internet, and routing the outbound data to one of the first physical port or the second physical port is based on the health of the satellite internet.

17. A method comprising:
providing a local-area network by a first module, the first module being packaged together as a single unit within a single first housing; and
coupling an accelerator to the local-area network via a first physical port of the accelerator connecting to the first module, the accelerator included in a second module, the second module being packaged together as a single unit within a single second housing, the second module being physically separate and distinct from the first module;
wherein the local-area network is connected to a public network before the coupling of the accelerator;
wherein the accelerator is programmed to receive outbound data from user devices via the first physical port from the first module; upon determining to route the outbound traffic to satellite internet, route the outbound data to the first module via the first physical port; and upon determining to route the outbound traffic to the wide-area network, route the outbound data to the wide-area network via the second physical port; and
wherein the first module includes an indoor unit configured for the satellite internet.

18. The method of claim 17, wherein the accelerator includes a second physical port configured to communicate with a wide-area network connected to the public network.

19. The method of claim 17, wherein the accelerator is programmed to receive the outbound data from the user devices via the local-area network, and route the outbound data to the public network via one of two connectivity paths.

20. The method of claim 19, wherein the accelerator is programmed to select the one of the two connectivity paths by executing an acceleration algorithm.

\* \* \* \* \*